US010158842B2

(12) United States Patent
McCloskey et al.

(10) Patent No.: US 10,158,842 B2
(45) Date of Patent: *Dec. 18, 2018

(54) CARGO SENSING DETECTION SYSTEM USING SPATIAL DATA

(71) Applicant: Honeywell International Inc., Morristown, NJ (US)

(72) Inventors: Scott McCloskey, Minneapolis, MN (US); Pedro Davalos, Plymouth, MN (US); Ryan A. Lloyd, Apple Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 485 days.

This patent is subject to a terminal disclaimer.

(21) Appl. No.: 13/923,229

(22) Filed: Jun. 20, 2013

(65) Prior Publication Data

US 2013/0342653 A1    Dec. 26, 2013

Related U.S. Application Data

(60) Provisional application No. 61/662,097, filed on Jun. 20, 2012.

(51) Int. Cl.
| *H04N 13/00* | (2018.01) |
| *H04N 13/204* | (2018.01) |
| *G01S 17/02* | (2006.01) |
| *G06Q 10/08* | (2012.01) |
| *G06Q 50/28* | (2012.01) |

(52) U.S. Cl.
CPC ......... *H04N 13/204* (2018.05); *G01S 17/026* (2013.01); *G06Q 10/08* (2013.01); *G06Q 50/28* (2013.01)

(58) Field of Classification Search
CPC .......................... H04N 13/0203; G01S 17/026
USPC ........................................................... 348/42
See application file for complete search history.

(56) References Cited

U.S. PATENT DOCUMENTS

| | | | |
|---|---|---|---|
| 2003/0164952 A1* | 9/2003 | Deichmann | A61B 1/05 356/603 |
| 2004/0125217 A1* | 7/2004 | Jesson | G06Q 10/087 348/231.3 |
| 2006/0095207 A1* | 5/2006 | Reid | G01S 11/12 701/301 |
| 2007/0070198 A1* | 3/2007 | Vera | G08B 13/196 348/143 |
| 2007/0075853 A1* | 4/2007 | Griffin | G01S 17/026 340/518 |
| 2007/0086624 A1* | 4/2007 | Breed | G06K 9/00362 382/104 |
| 2009/0321491 A1* | 12/2009 | Wick | B23Q 17/20 226/45 |

(Continued)

*Primary Examiner* — Jeremiah C Hallenbeck-Huber
*Assistant Examiner* — Amir Shahnami
(74) *Attorney, Agent, or Firm* — Brooks, Cameron & Huebsch, PLLC

(57) ABSTRACT

The present disclosure relates to devices, methods, and systems for cargo sensing. One cargo presence detection system includes one or more sensors positioned in an interior space of a container, and arranged to provide spatial data about at least a portion of the interior space of the container and a detection component that receives the spatial data from the one or more sensors and identifies if one or more cargo items are present in the interior space of the container based on analysis of the spatial data.

17 Claims, 3 Drawing Sheets

(56) References Cited

U.S. PATENT DOCUMENTS

| | | | |
|---|---|---|---|
| 2011/0200245 A1* | 8/2011 | Crothers | G05B 19/4183 382/141 |
| 2012/0086780 A1* | 4/2012 | Sharma | H04N 13/0022 348/46 |
| 2012/0154537 A1* | 6/2012 | Chang | H04N 5/2256 348/46 |

* cited by examiner

CARGO SENSING DETECTION SYSTEM USING SPATIAL DATA

TECHNICAL FIELD

The present disclosure relates to devices, methods, and systems for cargo sensing.

BACKGROUND

Cargo container operators, shipping logistic entities, or freight operators often need to manage and track a large fleet of cargo shipping containers or trailers (as used herein, the term "container" will be used generally to include cargo and other types of containers, storage areas, and/or trailers). However, it can be difficult to tell which containers are full and which are empty or to track full and/or empty containers, for example, in a shipping yard filled with cargo containers.

DETAILED DESCRIPTION

Figure 1:
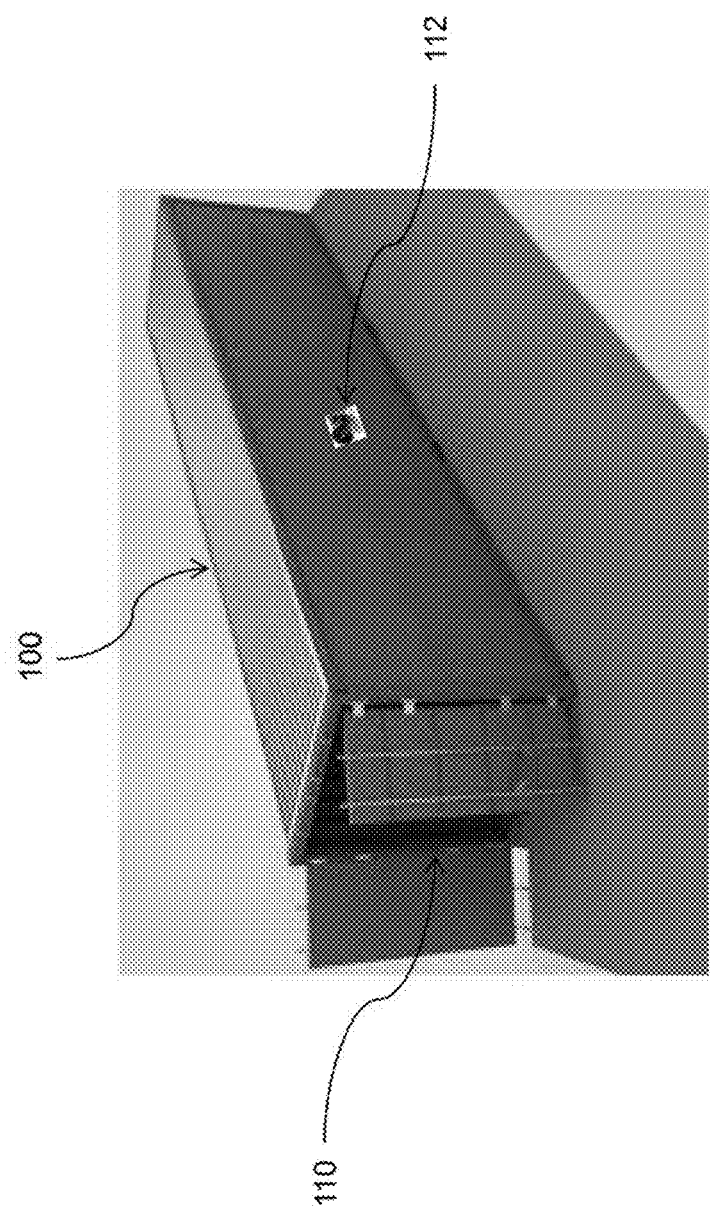
FIG. 1 illustrates a container having a cargo sensing functionality in accordance with one or more embodiments of the present disclosure.

Devices, methods, and systems for cargo sensing are described herein. In the present disclosure, the monitored entity can, for example, be the load-carrying space of a truck or trailer. As discussed above, containers, as used herein, tend to fall into various types of storage spaces including, but not limited to: the cargo item space of a parcel van, the trailer space where a trailer is towed by a separate tractor unit, or a container space where a demountable container is carried on a flat bed trailer.

Embodiments of the present disclosure can detect the presence of cargo items in a container and decide if the container is empty or non-empty through use of one or more active infra-red (IR) three-dimensional (3D) range sensors, computing device executable instructions (e.g., software algorithms), and a processing unit for executing the instructions. The executable instructions and processing unit can be used to analyze the sensor's 3D depth map output information to determine whether cargo is present in the container.

Cargo presence detection in shipping/storage containers would allow logistics operators to improve asset management, improve shipping fleet management, and/or improve inventory tracking. Additional benefits might include automated shipping container volume utilization measurement and/or tracking, security monitoring, and/or intrusion detection.

An embodiment could use any quantity or combination of vision-based sensors. A few examples of active IR 3D range sensors that project structured light include the PrimeSensor (near IR sensing system) and its derivatives such as the Microsoft Kinect sensor, the Asus Xtion Pro sensor, and the Asus Xtion Pro Live sensor, among other suitable sensors. Structured light is the process of projecting a known pattern of pixels (e.g., often grid patterns or line patterns) on to an area. The way that the pattern of pixels deform when striking surfaces within the area allows the system to calculate the depth and/or surface information of the objects (e.g., surfaces of objects onto which the pattern was projected) in the area.

An embodiment could also use a time-of-flight camera such as the Swiss Ranger 4000. A time-of-flight imaging sensor (e.g., camera) is a range imaging sensor system that resolves distance based on the speed of light, and thereby measures the time-of-flight of a light signal between the camera and the subject surface (e.g., interior surface of the container or surface of a cargo item) for each point of the image.

An embodiment could utilize passive stereo vision with grayscale or RGB imaging sensors such as the Bumblebee 2. Passive stereo vision approaches use two or more imaging sensors in distinct locations and compares the data collected by the sensors to determine the shapes of objects.

In some embodiments, the system can assume that the interior of the container has a planar floor and planar walls. In such embodiments, the executable instructions can attempt to fit the sensor's depth information to planar surfaces, and any outlier depth data that does not fit the continuous planar surfaces can, for example, be classified as protruding objects. In various embodiments, any objects exceeding a pre-specified volume or size threshold can be used to classify the shipping cargo container as non-empty.

Shipping containers and trailers may have various configurations including: trailer/container length from 20 to 53 feet, height and width typically 10 feet×8 feet, zero to five "roller doors" down each side, a roller or barn door at the rear end, roof constructed of either metal or fiberglass, and have metal or wooden walls, floor, and/or doors. The empty vs. non-empty detection functionality described herein could also apply to closets or storage rooms and areas with similar characteristics. For example, non-empty containers can refer to trailers that contain at least one cargo item (e.g., a 4×4×4 foot cargo package). As used herein, cargo items can be one or more boxes, items being shipped (e.g., tires, toys, etc), pallets of items or boxes, or other items that would be beneficial to be identified using such systems as are disclosed herein.

In some embodiments, the system can include one or more active IR 3D range sensors that have a maximum detection range that is less than the size of the container. This range limitation can be overcome, for example, through a sliding rail system that slides the sensor along the inside of the roof of the container, or other inner surface of the container, and/or through a panning mechanism that rotates the viewing angle of the sensor from the front end of the container to the back end, similar to a pan-tilt-zoom (PTZ) camera mechanism. Longer containers could be monitored by a combination of panning sensors, by one or more sensors having a rail system upon which the sensor slides, and/or by multiple fixed sensors.

Embodiments of the present disclosure that use active IR 3D range sensors allow for a multi-dimensional analysis of the container, such as for example, a full trailer volume measurement system. Such embodiments can provide a more accurate assessment of whether the container is empty or not empty and can provide for more accurate cargo utilization, among other benefits.

Furthermore, added benefits of an active IR 3D depth sensor include providing supplementary visible (RGB) video image output that can be used for human inspection and/or for security surveillance logging. Active IR 3D range sensors such as the PrimeSensor output depth information that has traditionally been utilized for entertainment, person-tracking, or motion detection. However, in embodiments of the present disclosure, executable instructions can be utilized to process the depth information output from the sensor and classify the area and/or volume under surveillance as a container surface or as a non-surface object which can be used for a variety of purposes, including those discussed herein.

This classification can also be achieved through filtering the depth map continuities. For example, assuming planar container surfaces, any discontinuities in those surfaces can be considered as cargo objects or blobs. This can be accomplished, for example, by having the sensor's depth information output sent to the processing unit, where the executable instructions can process the information.

In some embodiments, due to limitations of the maximum detection range and/or field of view of some active IR 3D sensors, full scanning, monitoring, and/or measuring of large containers can be achieved by one of several options. For example, the container can include a network of multiple sensors, such as one or more fixed mounted sensors, moving or sliding sensors (e.g., using a rail system), panning sensors, and/or tilting sensors. In some embodiments, panning or tilting sensors can be positioned at fixed locations or can be movable.

The sensor's depth information output can be analyzed and processed through an algorithm by executable instructions that can be used to classify the area as either a container's surface, or as a cargo object. The area can be classified as a wall, roof, or floor surface, for example, by assuming the wall and the roof or floor are orthogonal to the wall and by fitting the plane for each surface by evaluating continuous depth information from one or more sensors. Outlier depth information that does not fit the plane model, and exceeds a detection threshold, can be classified as cargo object blobs. These cargo object blobs can then indicate that the container is not empty.

Additionally, analyzing large containers where panning, tilting, and/or sliding a sensor is utilized to cover an area of interest, can, for example, involve possessing multiple individual frames, or snapshots, from the sensor.

In various embodiments, where an array of sensors is utilized within a container, if any of the sensors from the different areas under surveillance detects a cargo object, the container can be considered to be non-empty. The empty vs. non-empty decision (e.g., binary) from the cargo sensing system can then be relayed to an operator or a central container tracking and processing unit.

In some embodiments, the executable instructions can start by utilizing an algorithm, such as the Random Sample Consensus (RANSAC) algorithm to find a surface plane for a surface within the field of view of a sensor. A computing device executing instructions can then find a mask of objects above the surface plane. In some embodiments, the system can include threshold information to allow the system to ignore the walls of the cargo container and other small bodies. The system can examine each object above the surface plane individually, in various embodiments.

In some embodiments, for each object, the system can estimate the object's height (e.g., maximum distance from the floor surface). For example, it can estimate the height by building a distribution of some or all heights for points belonging to the object. The embodiment can use a large percentile from the distribution as the height estimate, such as the 97th percentile. The embodiment may use a large percentile to ignore large outliers in height estimates.

If the object's height surpasses the threshold, then instructions can be executed to determine the length and width of a bounding box around the object. For instance, it can project points from the object onto the ground and then build a 2D oriented rectangle around the projected points.

In such embodiments, the length and width of this 2D rectangle give the length and width of the 3D bounding box. The system can repeat this imaging process at arbitrarily many discrete points along the sensor's path of movement. If the system discovers an object that is over a threshold size (e.g., length, width, and/or height) in any frame, it can utilize this information to deem the cargo container full.

Prior art for detecting the presence of cargo in trailer containers have used ultrasonic range sensors. However, the approach of the present disclosure for using 3D range sensors allows for a measurement system that can provide accurate cargo detection. Furthermore, added benefits of video based imaging sensor are the visible (grayscale or RGB) image, which may be presented to a user for verification of the system's output.

As discussed above, a cargo sensing system can, for example, include a 3D range sensor, one or more computing device executable instructions (e.g., including software algorithms), and a processing unit (e.g., a central processing unit (CPU)), as well as active illuminators (e.g., IR light sources and/or flashes). Depending on the sensor's detection range and viewing angle, there may be several sensor placement configuration options. For example, a sensor and an illuminator flash may be placed on the overhead ceiling pointing down or at an angle.

A processing unit can be utilized to control one or more imaging sensors, handle data acquisition, and/or execute computing device readable instructions (e.g., run one or more software algorithms to analyze the data). The system can include executable instructions, for example, to perform cargo sensing measurements at pre-determined sampling intervals.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of sensors" can refer to one or more sensors.

FIG. 1 illustrates a container having a cargo sensing functionality in accordance with one or more embodiments of the present disclosure. In various embodiments, one or more sensors can be positioned in any suitable location within the container. In the embodiment illustrated in FIG. 1, the container has one sensor therein.

In this embodiment, a single sensor is movably mounted so that it can traverse from one end of the container to the other. In some embodiments, the sensor may not need to traverse all the way from one end to the other. In some embodiments, the sensor could traverse from one side of the container to another side or between a top and a bottom surface.

As discussed above, in some embodiments, a sensor may be fixed to the container, but may be capable of panning and/or tilting. A panning and/or tilting arrangement can also be utilized with sensors that are not fixed to the container.

Figure 2:
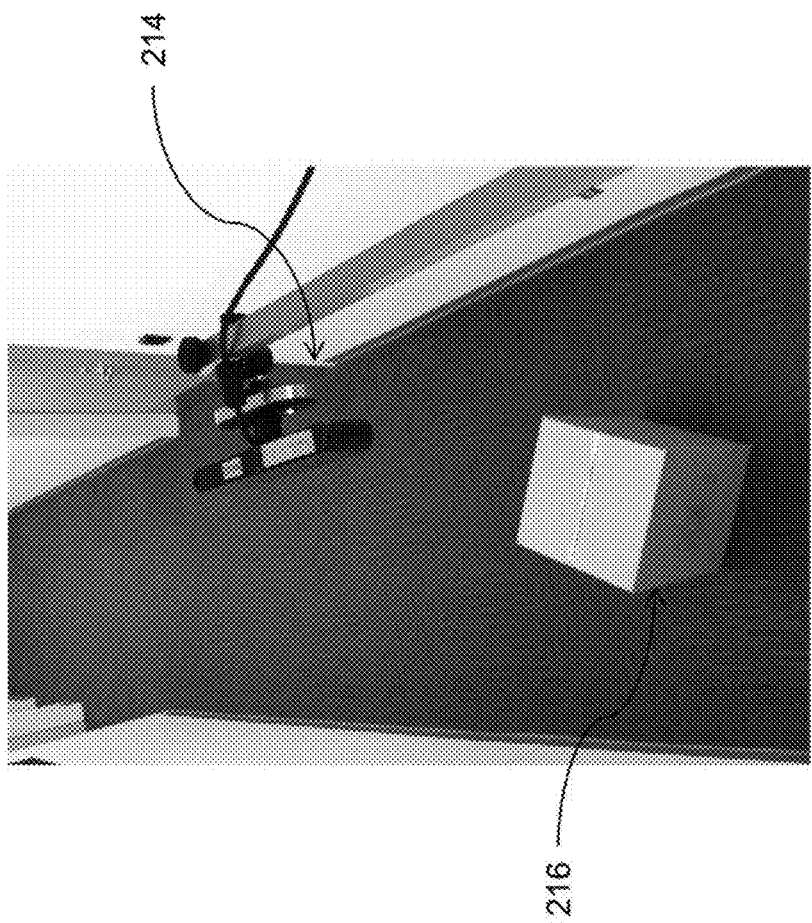
FIG. 2 illustrates an active IR 3D range sensor and a cargo item as an example of one or more embodiments of the present disclosure.

FIG. 2 illustrates an active IR 3D range sensor and a cargo item as an example of one or more embodiments of the present disclosure. In this embodiment, the sensor is positioned on a rail that is simulating a rail mounted near the roof of a container.

In some embodiments, the sensor could be movably mounted to the rail to traverse from one end of the rail to the other and, in some embodiments, able to stop at positions between the ends. In such an embodiment, if, for example, the height of the cargo item is above a threshold height that is pre-determined and within the executable instructions, then identification of the cargo item can indicate that the container is not empty.

Figure 3:
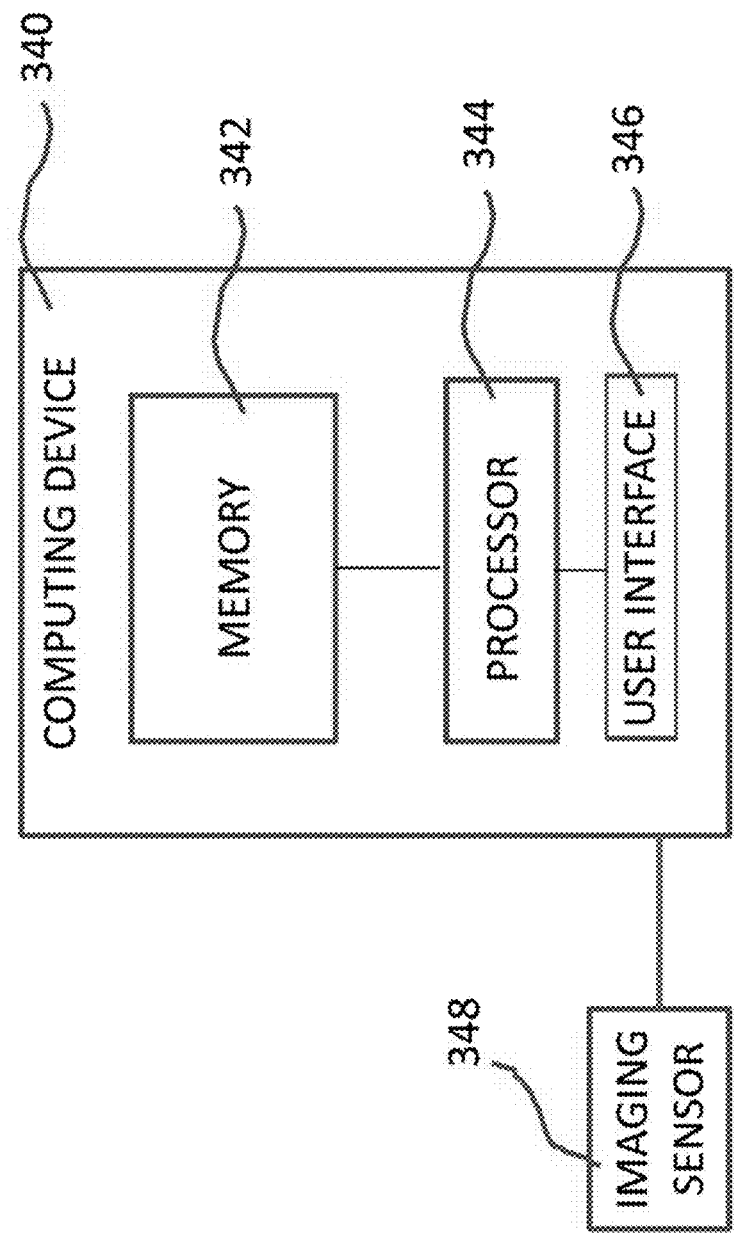
FIG. 3 illustrates a computing device for providing cargo sensing in accordance with one or more embodiments of the present disclosure.

FIG. 3 illustrates a computing device for providing cargo sensing in accordance with one or more embodiments of the present disclosure. Computing device 340 can be, for example, a laptop computer, a desktop computer, an embedded computer, or a mobile device (e.g., a mobile phone, a personal digital assistant, etc.), among other types of computing devices.

As shown in FIG. 3, computing device 340 can include a memory 342, a processor 344 coupled to memory 342, one or more user interface components 346, and the computing device 340 can be coupled wired or wirelessly to one or more sensors 348. As discussed above, several types of suitable sensors 348 can be utilized in the various embodiments discussed herein.

Memory 342 can be any type of storage medium that can be accessed by processor 344 to perform various examples of the present disclosure. For example, memory 342 can be a non-transitory computing device readable medium having computing device executable instructions (e.g., computer program instructions) stored thereon that are executable by processor 344 to provide image based cargo sensing in accordance with one or more embodiments of the present disclosure.

Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 342 is illustrated as being located in computing device 340, embodiments of the present disclosure are not so limited. For example, memory 342 can also be located internal to another computing resource (e.g., enabling computer executable instructions to be downloaded over the Internet or another wired or wireless connection).

As shown in FIG. 3, computing device 340 can also include a user interface 346. User interface 346 can include, for example, a display (e.g., a screen). The display can be, for instance, a touch-screen (e.g., the display can include touch-screen capabilities).

User interface 346 (e.g., the display of user interface 346) can provide (e.g., display and/or present) information to a user of computing device 340. For example, user interface 346 can provide a display of possible areas, regions, blobs that may contain cargo, location information regarding which containers are empty or not empty, and/or statistics regarding which containers are empty or not empty, as previously described herein.

Additionally, computing device 340 can receive information from the user of computing device 340 through an interaction with the user via user interface 346. For example, computing device 340 can receive input from the user, such as a determination as to where a container is empty or not based upon the user's analysis of the information provided by the one or more imaging sensors, as previously described herein. The user can enter the input into computing device 340 using, for instance, a mouse and/or keyboard associated with computing device 340 (e.g., user interface 346), or by touching user interface 346 in embodiments in which user interface 346 includes a touch-screen. Such processes can be accomplished locally (near the container) or remotely with respect to the container (at a location not near the container).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. Accordingly, inventive subject matter lies in less than all features of a single disclosed embodiment.

The invention claimed is:

1. A cargo presence detection system, comprising:
one or more active infrared three dimensional sensors positioned in an interior space of a container and a sensor to project structured light within the interior space of the container, and wherein the one or more active infrared three dimensional sensors are arranged to provide spatial data and depth information about at least a portion of the interior space of the container based on a deformation of the structured light when striking surfaces within the container, and wherein the one or more active infrared three dimensional sensors provide supplementary visible video image output;

a sliding rail system coupled to a top side of the container to move the one or more active infrared three dimensional sensors and the sensor from a first position to a second position;

a panning mechanism coupled to the one or more active infrared three dimensional sensors to rotate a viewing angle of the one or more active infrared three dimensional sensors between the first position and the second position; and a computing device to:
  receive the spatial data and depth information from the one or more sensors and identifies if one or more cargo items are present in the interior space of the container based on analysis of the spatial data and depth information, wherein the spatial data and depth information is based on a plurality of snapshots captured by the one or more active infrared three dimensional sensors positioned a plurality of positions between the first position and the second position by the sliding rail system and the panning mechanism;
  estimate a height of the identified one or more cargo items by building a distribution of points belonging to the one or more cargo items;
  determine when the height estimate of the identified one or more cargo items exceeds a threshold; and
  determine a length and width of the identified one or more cargo items based on a generated two dimensional rectangle around a plurality of projected points when the one or more cargo items exceeds the threshold.

2. The cargo presence detection system of claim 1, wherein the system includes a communication component to communicate at least one of: the spatial data, an identification determination based on the analysis of the spatial data, an empty/non-empty determination based on the analysis of the spatial data.

3. The cargo presence detection system of claim 1, wherein at least one of the one or more active infrared three dimensional sensors is an active near infrared three dimensional sensor.

4. The cargo presence detection system of claim 1, wherein the spatial data provided by the one or more sensors includes at least one of: depth information and three dimensional points.

5. The cargo presence detection system of claim 1, wherein at least one of the one or more sensors is movable within the interior of the container.

6. The cargo presence detection system of claim 5, wherein the movement of the at least one sensor is at least one of: pivot and tilt movement.

7. The cargo presence detection system of claim 1, wherein at least one of the one or more sensors is a time-of-flight imaging sensor.

8. A cargo presence detection system, comprising:
  one or more vision based active infrared three dimensional sensors positioned in an interior space of a and a sensor to project structured light within the interior space of the container, and wherein the one or more sensors are arranged to provide spatial data about at least a portion of the interior space of the container based on a deformation of the structured light when striking surfaces within the container, and wherein the one or more active infrared three dimensional sensors provide supplementary visible video image output;

a sliding rail system coupled to a top side of the container to move the one or more active infrared three dimensional sensors and the sensor from a first position to a second position;

a panning mechanism coupled to the one or more active infrared three dimensional sensors to rotate a viewing angle of the one or more active infrared three dimensional sensors between the first position and the second position; and a computing device that:
  receives the spatial data and depth information from the one or more sensors and identifies if one or more cargo items are present in the interior space of the container based on analysis of the spatial data and depth information, wherein the spatial data and depth information is based on a plurality of snapshots captured by the one or more active infrared three dimensional sensors positioned a plurality of positions between the first position and the second position by the sliding rail system and the panning mechanism;
  estimates a height of the identified one or more cargo items by building a distribution of points belonging to the one or more cargo items;
  determines when a height estimate of the identified one or more cargo items exceeds a threshold; and
  determines a length and width of the identified one or more cargo items based on a generated two dimensional rectangle around a plurality of projected points when the one or more cargo items exceeds the threshold.

9. The cargo presence detection system of claim 8, wherein at least one of the one or more vision based sensors has a zoom functionality.

10. The cargo presence detection system of claim 8, wherein at least one of the one or more vision based sensors is a passive stereo vision imaging sensor.

11. The cargo presence detection system of claim 8, wherein computing device receives depth information from the one or more sensors and fits the sensor depth information to planar surfaces to determine if the is any outlier depth data that does not fit the continuous planar surfaces.

12. The cargo presence detection system of claim 8, wherein computing device receives data from the one or more sensors and determines if any objects identified from the data exceed a pre-specified volume or size threshold.

13. A cargo presence detection system, comprising:
  one or more active infrared three dimensional sensors in an interior space of a container to project structured light within the interior space of the container to provide spatial data and depth information about at least a portion of the interior space of the container based on a deformation of the structured light when striking surfaces within the container, wherein the one or more sensors collect data regarding a first area of the interior space of the container and then move to collect data regarding a second area of the interior space of the container and wherein the one or more active infrared three dimensional sensors provide supplementary visible video image output;

a sliding rail system coupled to a top side of the container to move the one or more active infrared three dimensional sensors and the sensor from the first area to the second area;

a panning mechanism coupled to the one or more active infrared three dimensional sensors to rotate a viewing angle of the one or more active infrared three dimensional sensors between the first area and the second area; and a computing device that:
receives the spatial data and depth information from the one or more sensors and identifies if one or more cargo items are present in the interior space of the container based on analysis of the spatial data and depth information, wherein the spatial data and depth information is based on a plurality of snapshots captured by the one or more active infrared three dimensional sensors positioned a plurality of areas between the first area and the second area by the sliding rail system and the panning mechanism;

estimates a height of the identified one or more cargo items by building a distribution of points belonging to the one or more cargo items;

determines when a height estimate of the identified one or more cargo items exceeds a threshold; and determines a length and width of the identified one or more cargo items based on a generated two dimensional rectangle around a plurality of projected points when the one or more cargo items exceeds the threshold.

14. The cargo presence detection system of claim 13, wherein the spatial data identifies one or more dimensions of an object.

15. The cargo presence detection system of claim 13, wherein the spatial data identifies a first spatial dimension of an object and that dimension is used to estimate one or more other dimensions of the object.

16. The cargo presence detection system of claim 13, wherein the spatial data identifies a first dimension value of an object and if the first dimension is larger than a threshold value, that dimension value is used to estimate one or more other dimensions of the object.

17. The cargo presence detection system of claim 13, wherein the spatial data is presented to a user to verify a presence of an object with the interior space of the container.

* * * * *